(12) United States Patent
de Oliveira

(10) Patent No.: US 7,658,569 B2
(45) Date of Patent: Feb. 9, 2010

(54) EXTENSIBLE BAR WITH A SIMPLIFIED LOCKING SYSTEM

(75) Inventor: Diego Müller de Oliveira, Canoas (BR)

(73) Assignee: Maxiforja S/A Forjaria E Metalurgia, Canoas, RS (BR)

( * ) Notice: Subject to any disclaimer, the term of this patent is extended or adjusted under 35 U.S.C. 154(b) by 48 days.

(21) Appl. No.: 11/481,466

(22) Filed: Jul. 6, 2006
(Under 37 CFR 1.47)

(65) Prior Publication Data
US 2007/0102168 A1    May 10, 2007

(30) Foreign Application Priority Data
Jul. 7, 2005    (BR) .................................. 0502606

(51) Int. Cl.
*F16B 21/00*    (2006.01)
(52) U.S. Cl. .................... 403/330; 403/322.4; 403/325; 403/327; 56/14.9
(58) Field of Classification Search .............. 403/322.1, 403/322.4, 325, 327, 330; 56/14.9, 15.6; 172/272, 684.5, 439, 743
See application file for complete search history.

(56) References Cited

U.S. PATENT DOCUMENTS

| | | | |
|---|---|---|---|
| 1,278,100 A * | 9/1918 | Bruning | 403/322.4 |
| 3,011,800 A * | 12/1961 | Mitsuyasu | 280/482 |
| 3,446,518 A * | 5/1969 | Dodgson et al. | 280/482 |
| 3,853,335 A * | 12/1974 | Heckenkamp | 172/272 |
| 4,221,399 A | 9/1980 | Berg | |
| D337,292 S * | 7/1993 | Carda | D12/162 |
| 5,327,978 A | 7/1994 | Bremner | |
| 5,361,850 A * | 11/1994 | Muller et al. | 172/439 |
| 6,149,180 A | 11/2000 | Haws | |
| 6,655,468 B2 * | 12/2003 | Casali et al. | 172/439 |

FOREIGN PATENT DOCUMENTS

FR    2 715 893 A    8/1995

OTHER PUBLICATIONS

Yahoo! Babel Fish Online Translation: Viiki Paavo Antero (FR 2 715 893), pp. 1-3. world.altavista.com, Oct. 31, 2008.*

* cited by examiner

*Primary Examiner*—Michael P Ferguson
(74) *Attorney, Agent, or Firm*—Alston & Bird LLP

(57) ABSTRACT

An extensible bar comprises a bar and a sleeve that slide over each other and are kept together by a pin. The extensible bar includes a locking system made up of a latch connected by a wire spring to the sleeve, the latch preventing sliding movement between the sleeve and the bar when the latch is positioned within respective recesses formed in the bar and in the sleeve when the recesses are aligned. The wire spring urges the latch into the recesses. Unlocking of the assembly entails pulling the latch out of the recesses by grasping and pulling a handle attached to the latch. The locking system can be blocked by turning the latch about the wire spring into an orientation that prevents the latch from entering the recesses. The locking, unlocking, and blocking functions are performed by an assembly of only three parts; the latch, the wire spring, and the handle.

13 Claims, 3 Drawing Sheets

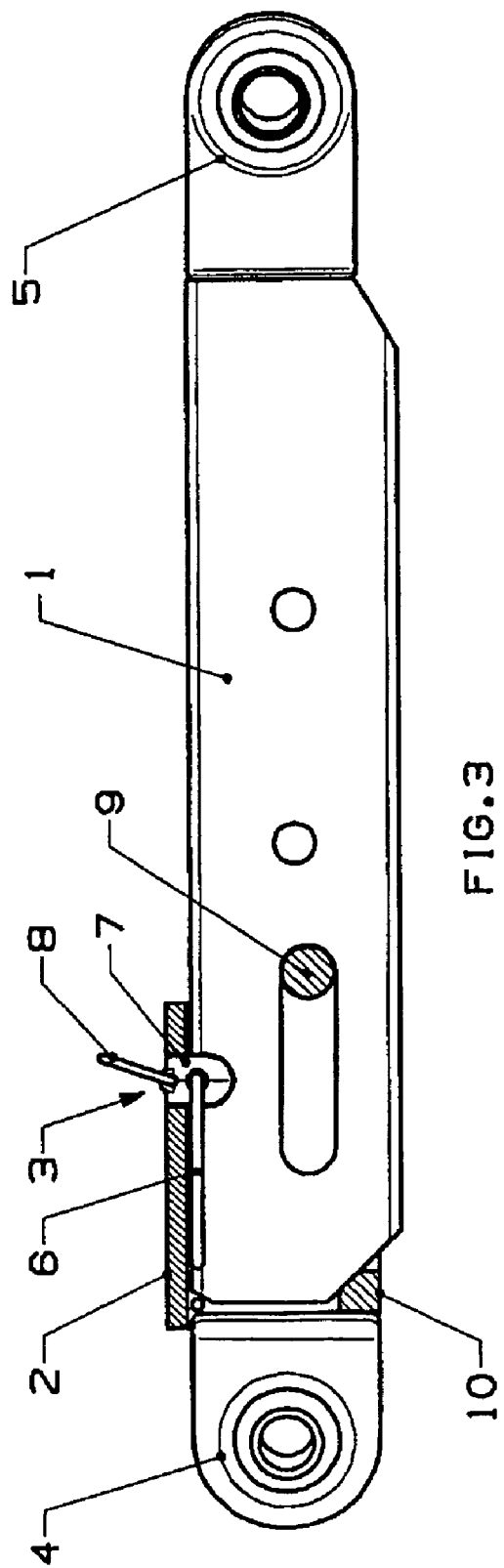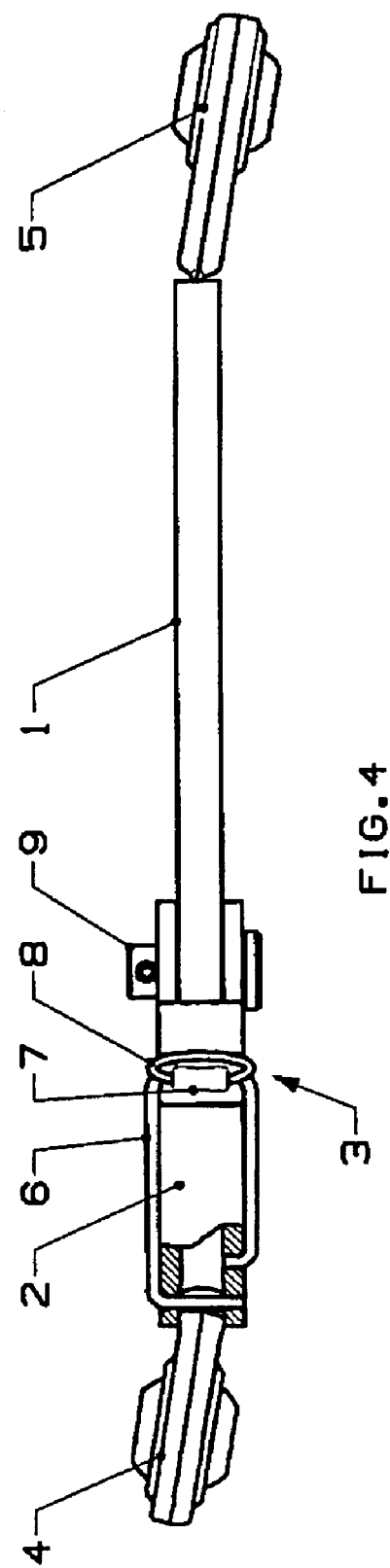

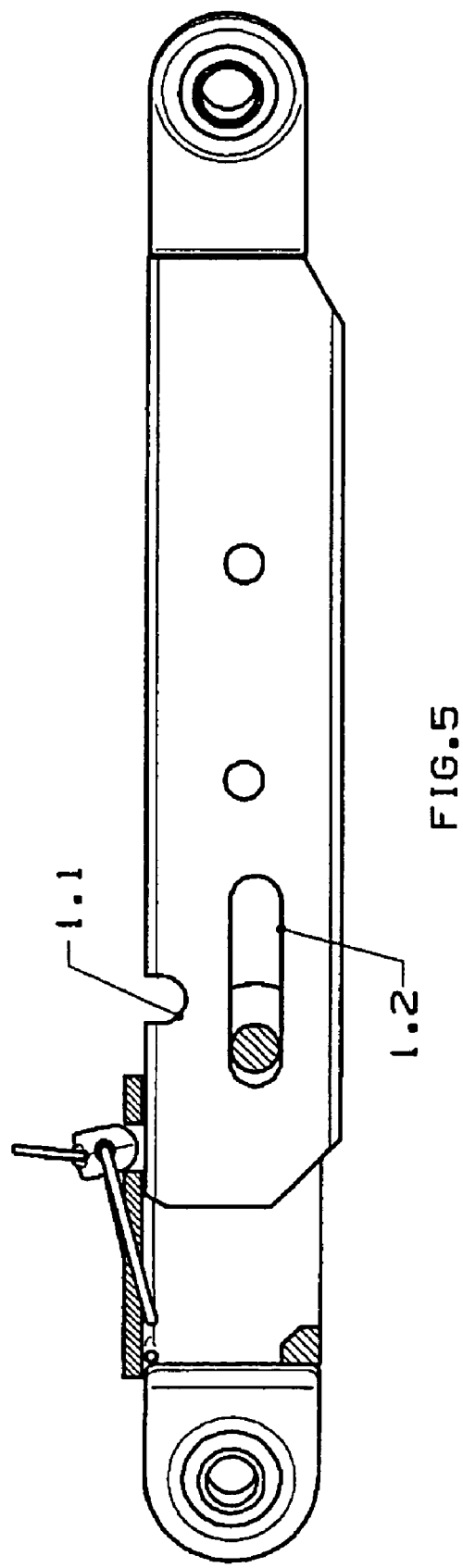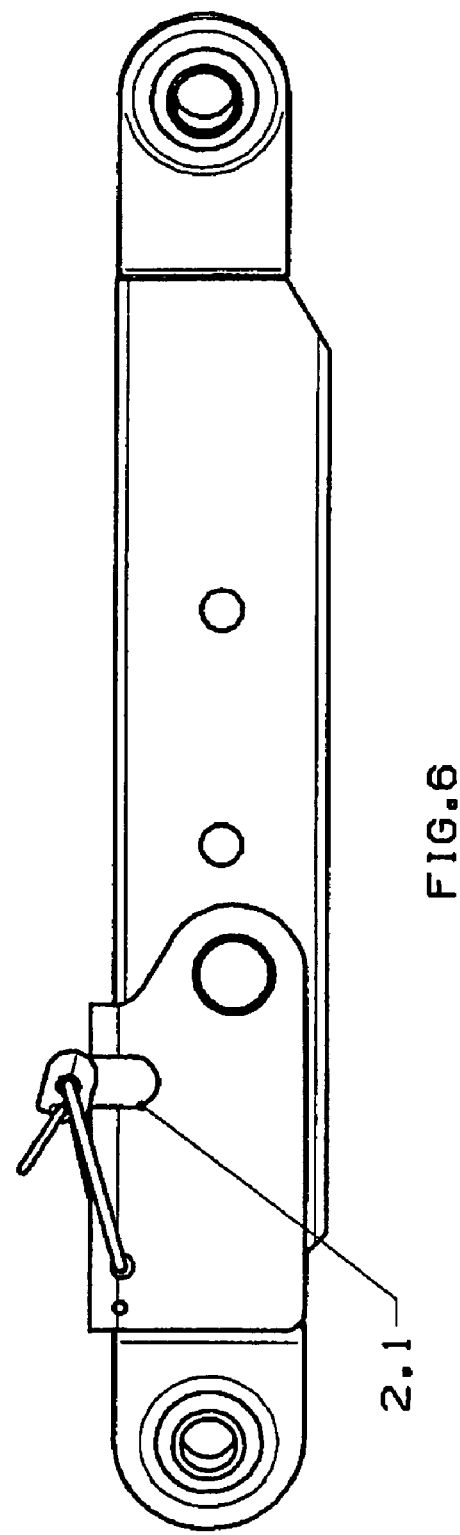

EXTENSIBLE BAR WITH A SIMPLIFIED LOCKING SYSTEM

FIELD OF THE INVENTION

The present invention refers to an extensible bar with a simplified locking system for attachment of agricultural accessories to tractors.

BACKGROUND OF THE INVENTION

In the agricultural field there are employed devices for attachment of agricultural accessories to tractors in the form of a pair of long bars provided with eyelets at the ends thereof. The eyelets form ball joints when attached to the pins of the tractor and of the accessory. In general these bars are rigid, which renders difficult the attachment thereof when the tractor is not parked at the exact distance of the accessory which is required for the engagement. However, there exist certain bars designated as extensible or telescopic that allow the attachment in such cases, due to their ability to disassemble an end thereof and extend the same until the point of engagement of the accessory without however disconnecting the same from the rest of the bar. In order to reassemble the bar and render the same rigid, it is necessary that the tractor driver moves the tractor backwards, until the bar reaches its initial position and remain thereat due to the action of an automatic spring-loaded latch.

There is known in the art, for example, the French patent document number FR 2 715 893-A3 that refers to an extensible bar made out of two elements: one in the form of a bar that is attached to the tractor by a spherical eyelet and another element in the form of a sleeve, also provided with an eyelet at the end thereof. The bar fits within the sleeve and is locked therein by a pin that extends through the two parts passing through orifices in the sleeve and through a slot provided in longitudinal alignment in the bar. Thereby the bar is allowed to slide longitudinally within the sleeve along a path equivalent to the length of the slot. In the bar there is also a U-shaped space near the slot wherein is accommodated a latch that slides perpendicularly to the bar within a chamber in the upper part of the sleeve, to inhibit the telescopic movement when the assembly is in the operating position. The latch is kept pressed against the bar by helical springs and is removed by pulling a pin that crosses the sleeve chamber. The latch may be kept in the retracted position by a blocking system actuated by the rotation of the pin around the axis thereof, thus facilitating the detachment of the device.

The technique described in this document requires a large number of components to form the mechanism that actuates the latch comprised of two springs, a pin, a latch, a cover-shaped plate, four bolts, and a grease nipple, in addition to a plate that forms the chamber that is welded to the sleeve. Both the quantity and the process of manufacture of these components contribute to a high cost of production of the assembly.

There exist in the art other patent documents relative to extensible bars, such as, for example, Brazilian patent application No. BR PI9905125-7A, which refers to an extensible bar with an equally complex locking system.

BRIEF SUMMARY OF THE INVENTION

The purpose of the present invention consists in simplifying the mechanism used to lock the bars in the operating position, and thus reduce the cost of production of the assembly.

The object of the invention is an extensible bar provided with a locking system driven by a wire spring that acts directly on a latch.

One characteristic of the system is that the wire spring is attached directly to the sleeve by means of insertion of the ends thereof in two holes provided in the sleeve.

Another characteristic of the invention is that the wire spring drives the latch laterally into its housing in the sleeve. The latch is pulled out of the housing by means of a pull handle attached directly to the latch.

Another characteristic of the invention is the ability to position the latch such that the same is prevented to enter the housing, due to the turning capacity thereof around the spring, due to the fact that its height exceeds its thickness, and due to the position of the hole that extends therethrough such that the distances from the hole to the base and from the hole to the top are greater than the distances from the hole to the walls that are in contact with the sleeve. With this characteristic, the locking system is blocked and the assembly is thus kept unlocked.

Another characteristic is the pre-deformation of the wire spring, i.e. the spring is built such that it is necessary to deform it in order to assemble the set. This forces permanently the latch into the housing, including when the assembly is locked.

Therefore, the objective of the present invention is to provide an extensible bar with a simplified locking system, comprising a bar having at one end thereof a ball joint and having a sleeve at the other end, such sleeve slidably fitting over the bar and having at the end opposite to the attachment to the bar a ball joint. The locking system is comprised of an articulated latch attached to the sleeve by means of a wire spring, which latch upon being accommodated in the sleeve fits into a recess provided in the bar, thereby locking the sleeve and bar assembly.

In a preferred embodiment, the latch turns about the wire spring and is provided with a pull ring.

In another preferred embodiment, the wire spring is directly attached to the sleeve by means of insertion of its opposite ends to the latch in two holes provided in the sleeve.

In yet another preferred embodiment, the wire spring laterally guides the latch into its housing in the sleeve.

In another also preferred embodiment, the height of the latch is greater than the thickness thereof.

In another preferred embodiment, the wire spring is pre-deformed such that the latch is permanently forced into its housing in the sleeve.

Also in another preferred embodiment, the locking system is blocked in the unlocked position when the latch is turned about the wire spring, when the same is outside of the sleeve housing.

BRIEF DESCRIPTION OF THE DRAWINGS

The figures of the attached drawings show an example of application of the simplified locking system in an extensible bar, where:

FIG. 3 shows a side view of the extensible bar in locked condition with the sleeve depicted in cross section;

FIG. 4 shows the extensible bar in locked condition, seen from the top, with the sleeve in partial section view;

FIG. 5 shows a side view of the extensible bar in extended condition, with the sleeve depicted in cross section; and, FIG. 6 shows the extensible bar with blocked locking.

DETAILED DESCRIPTION OF THE DRAWINGS

Figure 1:
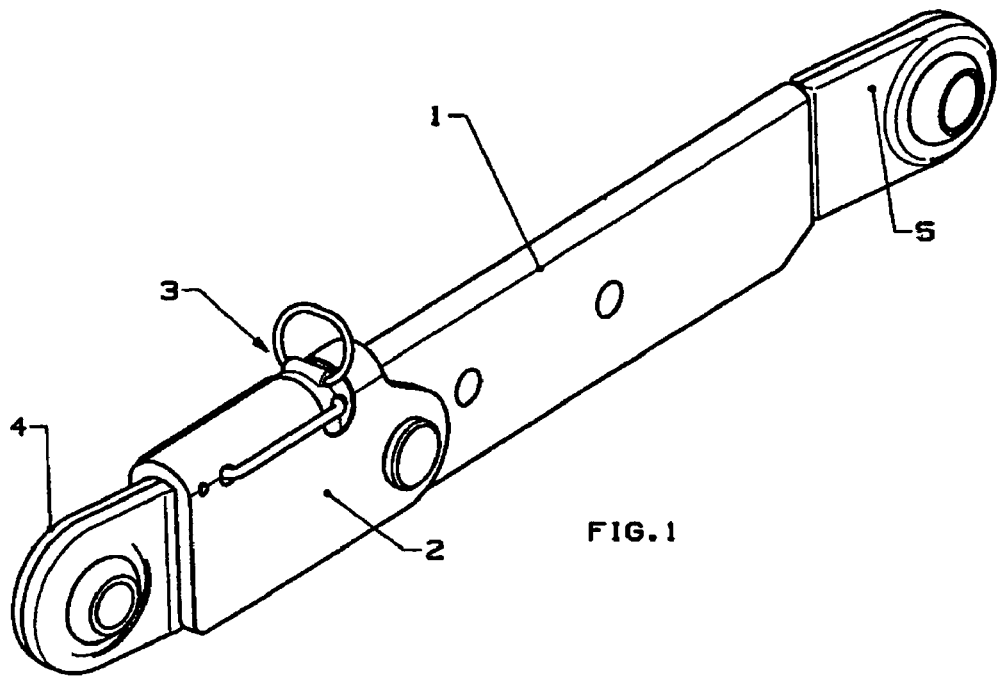
FIG. 1 shows an extensible bar in locked condition seen in perspective.
Figure 2:
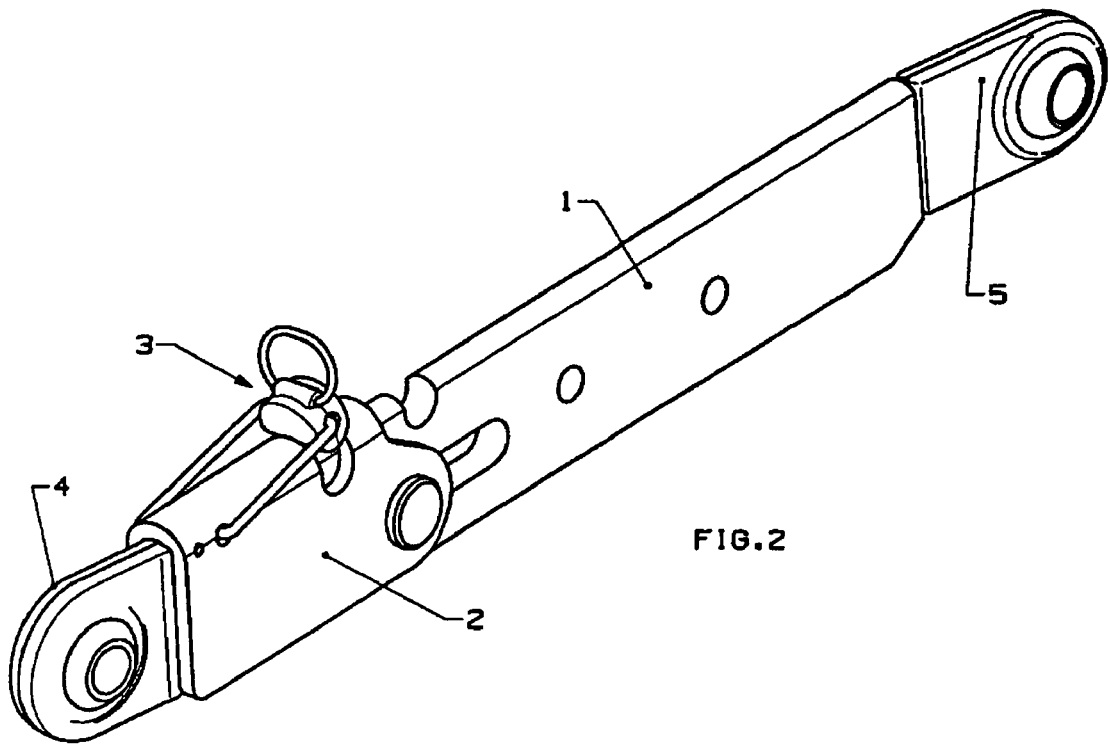
FIG. 2 shows the extensible bar in an extended condition, seen in perspective.

FIGS. 1 and 2 show the main parts of the assembly, consisting in the bar 1, the sleeve 2, the locking system 3 and the ball joints 4 and 5.

The locking system 3, which assembly is better viewed in FIGS. 3 and 4, is comprised of a wire spring 6, a latch 7 and a pull ring 8. The spring is made of bent steel wire and passes through the latch 7 by a through hole. The ring 8 is made of curved wire and the ends thereof are inserted in another through hole in the upper part of the latch 7. The assembly of the locking system 3 to the sleeve 2 is made by means of insertion of the ends of the wire spring 6 into the sleeve 2 in two unaligned holes, i.e. a through hole and a blind hole, as may be clearly seen in FIG. 4. The wire spring 6, when separated from the assembly, does not have the shape shown in FIGS. 1 and 3, since it is pre-deformed in order that when assembled it will be kept under tension, forcing the latch 7 against the bar 1 and into the housing 1.1 of bar 1 and the housing 2.1 of sleeve 2. Thus, in order to move the latch 7 out of the housings 1.1 and 1.2, it is necessary to pull the latch 7 using the ring 8, deforming the wire spring 6 in the opposite sense of its pre-deformation and moving the same further away from its rest position, as shown in FIGS. 2 and 5. Due to its shape and to the manner in which the wire spring is attached to the sleeve 2, the latch 7 is laterally guided by the wire spring 6 into the housing 2.1, that is, the latch 7 can not move laterally when the system 3 is locked, as may be observed in FIGS. 1 and 4.

The sleeve 2 is made of thick plate bent at 180° which is welded to a ball joint 4 according to any one of the figures and is kept attached to the bar 2 due to the pin 9 that passes through the sleeve 2 by means of a through hole and passes through the bar 1 by means of the slot 1.2. This pin 9 limits the movement of the sleeve 2 in the longitudinal sense and allows rotation of the sleeve 2 about the axis of the pin 9 when the sleeve is in any extended position, except in the locking position, when the abutment 10 prevents the rotational movement, while the latch 7 prevents the translation movement.

With a turning movement of the latch 7 about the wire spring 6, as shown in FIG. 6, the locking system is blocked in the unlocked position, since in this position, due to having a height greater than its thickness, the latch 7 can not enter the housing. With the locking system 3 blocked, the sleeve 2 may slide freely without locking, thus facilitating the detachment of the accessory.

In FIG. 1, the extensible bar is in the operating position and locked, as well as in FIG. 4, whereby it may be understood how the latch 7 actuates. By pulling manually the latch 7 using a ring 8 to bring the latch out of the housings 1.1 and 2.1, the sleeve 2 is free to move along the longitudinal direction of the bar and to rise by a rotational movement about the pin 9, to facilitate the attachment of the ball joint 4 to the accessory, since the ball joint 5 is secured to the tractor. With the ball joint 4 engaged to the accessory, a reverse movement of the tractor will approach the same relatively to the accessory making the sleeve 2 slide over the bar 1 until the latch 7 that is forced by the wire spring 6 against the bar 1 engages the housing 1.1 of the bar 1 and the housing 2.1 of the sleeve 2, thus locking the assembly.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An extensible bar assembly with a simplified locking system, comprising a bar having at one end thereof a ball joint and at the other end a sleeve, said sleeve slidably fitting over the bar and having a ball joint at the opposite end to the engagement with the bar, and further comprising a locking system comprised of an articulated latch body attached to the sleeve by means of a wire spring, the wire spring having one portion pivotably connected to the sleeve and an opposite portion formed by a wire which passes through a hole in the latch body whereby the latch body is rotatably mounted on said wire such that the latch body is rotatable between a locking orientation and a blocking orientation, wherein when said latch body is placed in the locking orientation said latch body passes through an opening in the sleeve and engages a recess provided in the bar, preventing the sleeve from sliding relative to the bar and thus locking the assembly formed by the sleeve and the bar, and wherein when the wire spring is pivoted relative to the sleeve the wire spring allows the latch body to be pulled out of the recess and the opening and rotated on said wire into the blocking orientation in which the latch body cannot pass through the opening in the sleeve and engage the recess and the sleeve, allowing the sleeve to slide relative to the bar.

2. A bar assembly according to claim 1, wherein the latch body is provided with a pull ring for pivoting the wire spring.

3. A bar assembly according to claim 1, wherein the wire spring is formed by a wire having opposite ends, the wire being bent such that the ends are directly secured to the sleeve by means of insertion of the ends in two holes in the sleeve.

4. A bar assembly according to claim 1, wherein the wire spring laterally guides the latch body into a housing in the sleeve.

5. A bar assembly according to claim 1, wherein the height of the latch body is greater than its thickness.

6. A bar assembly according to claim 1, wherein the wire spring is pre-deformed such that the latch body is biased into a housing in the sleeve.

7. A bar assembly according to claim 1, wherein the locking system is blocked in an unlocked position upon turning the latch body about the wire spring into the blocking orientation, when the latch is outside of a housing of the sleeve.

8. A bar assembly according to claim 1, wherein the sleeve includes a transverse pin which is received through a longitudinal slot in the bar so as to permit relative sliding movement in-a longitudinal direction of the bar between retracted and extended positions.

9. A bar assembly according to claim 8, wherein the sleeve has an inverted U-shape in cross section so as to permit relative rotational movement of the bar and sleeve about the axis of the pin at least in the extended position.

10. A bar assembly according to claim 9, further comprising an abutment on the sleeve for engaging the bar in the retracted position so as to prevent relative rotational movement of the bar and sleeve about the axis of the pin.

11. An extensible bar assembly, comprising:
a bar having opposite first and second ends;
a first ball joint affixed to the first end of the bar;

a sleeve connected to the bar by a pin slidable in a slot in the bar, the slot extending longitudinally along the bar, such that the sleeve is slidable longitudinally along the bar, the sleeve defining an opening through a wall of the sleeve;

a second ball joint affixed to one end of the sleeve; and a locking system for locking the sleeve and bar such that the sleeve is prevented from sliding along the bar, the locking system including:

a wire spring having one portion pivotably connected to the sleeve and having an opposite portion;

a latch body defining a height and a thickness wherein the height is greater than the thickness, the latch body being mounted on said opposite portion of the wire spring such that the latch body is rotatable about said opposite portion between a locking orientation and a blocking orientation, the locking orientation presenting the thickness of the latch body to the opening in the sleeve, and the blocking orientation presenting the height of the latch body to the opening; and a recess defined in the bar, wherein the opening is located to be aligned with the recess when the sleeve is slid along the bar to an operating position, the opening being sized such that the thickness of the latch body can pass through the opening to allow the thickness of the latch body to extend through the opening into the recess when the latch body is in the locking orientation, thereby locking the sleeve in the operating position and preventing the sleeve from sliding relative to the bar, the opening being sized to prevent the height of the latch body from extending through the opening into the recess when the wire spring is pivoted relative to the sleeve and the latch body is rotated into the blocking orientation, allowing the sleeve to slide relative to the bar;

wherein the wire spring biases the latch body in a direction to extend through the opening into the recess.

12. A bar assembly according to claim 11, wherein the wire spring is formed by a wire having opposite ends, the wire being bent such that the ends are directly secured to the sleeve by means of insertion of the ends in two holes in the sleeve.

13. A bar assembly according to claim 12, wherein the latch body has a through hole, and a portion of the wire passes through the through hole in the latch body, the latch body being rotatable about said portion of the wire.

\* \* \* \* \*